Nov. 24, 1925.
A. R. DODGE
GUIDE AND FOLDER
Filed April 4, 1922 3 Sheets-Sheet 2
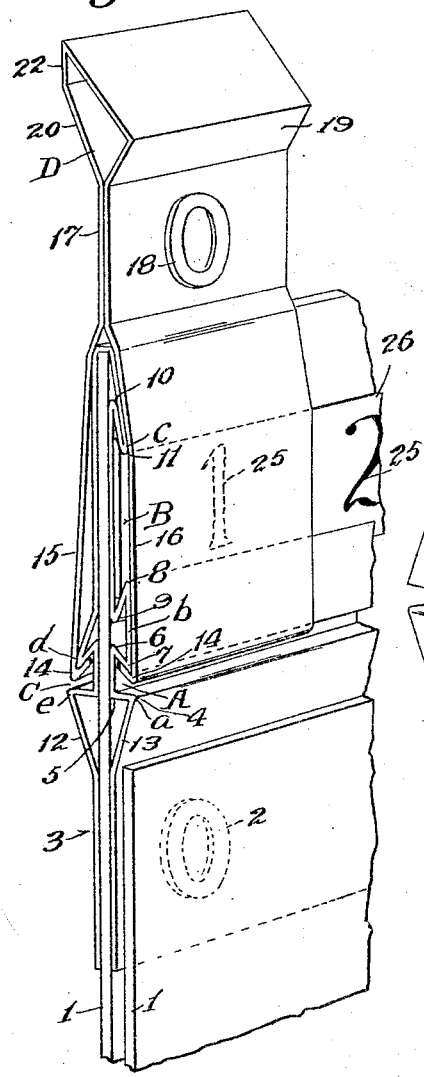
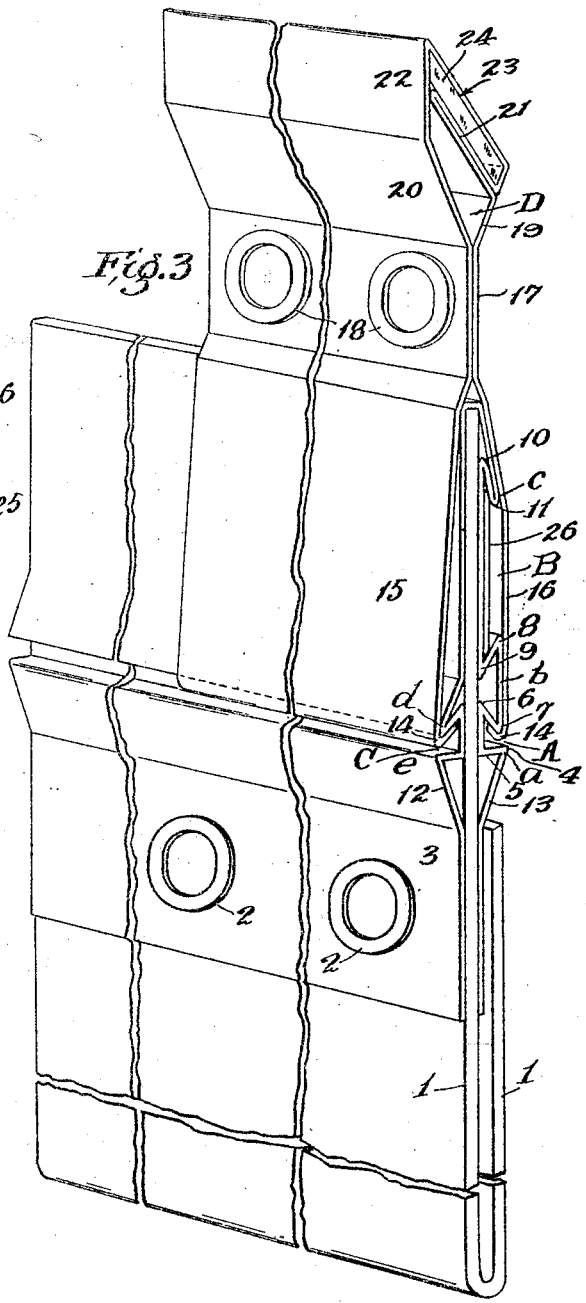
WITNESS
C. C. Holly
INVENTOR.
Arthur Roswell Dodge
BY James R. Townsend
his ATTORNEY Nov. 24, 1925.
A. R. DODGE
1,562,622
GUIDE AND FOLDER
Filed April 4, 1922
3 Sheets—Sheet 3
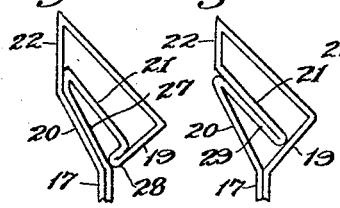
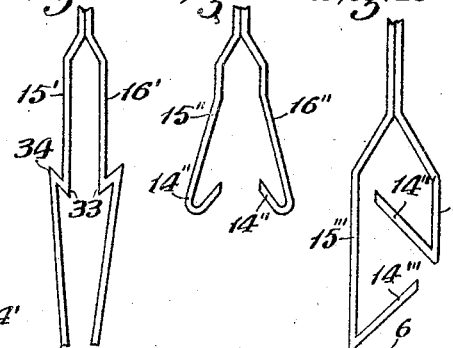
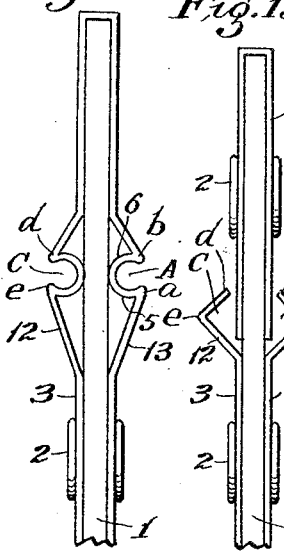
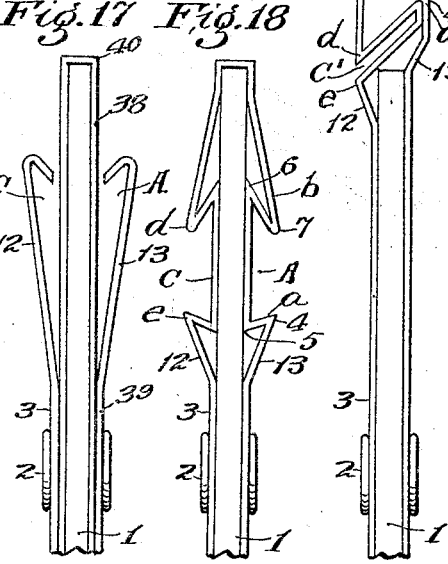
INVENTOR.
Arthur Roswell Dodge
BY R. Townsend
ATTORNEY.
WITNESS
C. C. Holly Patented Nov. 24, 1925.

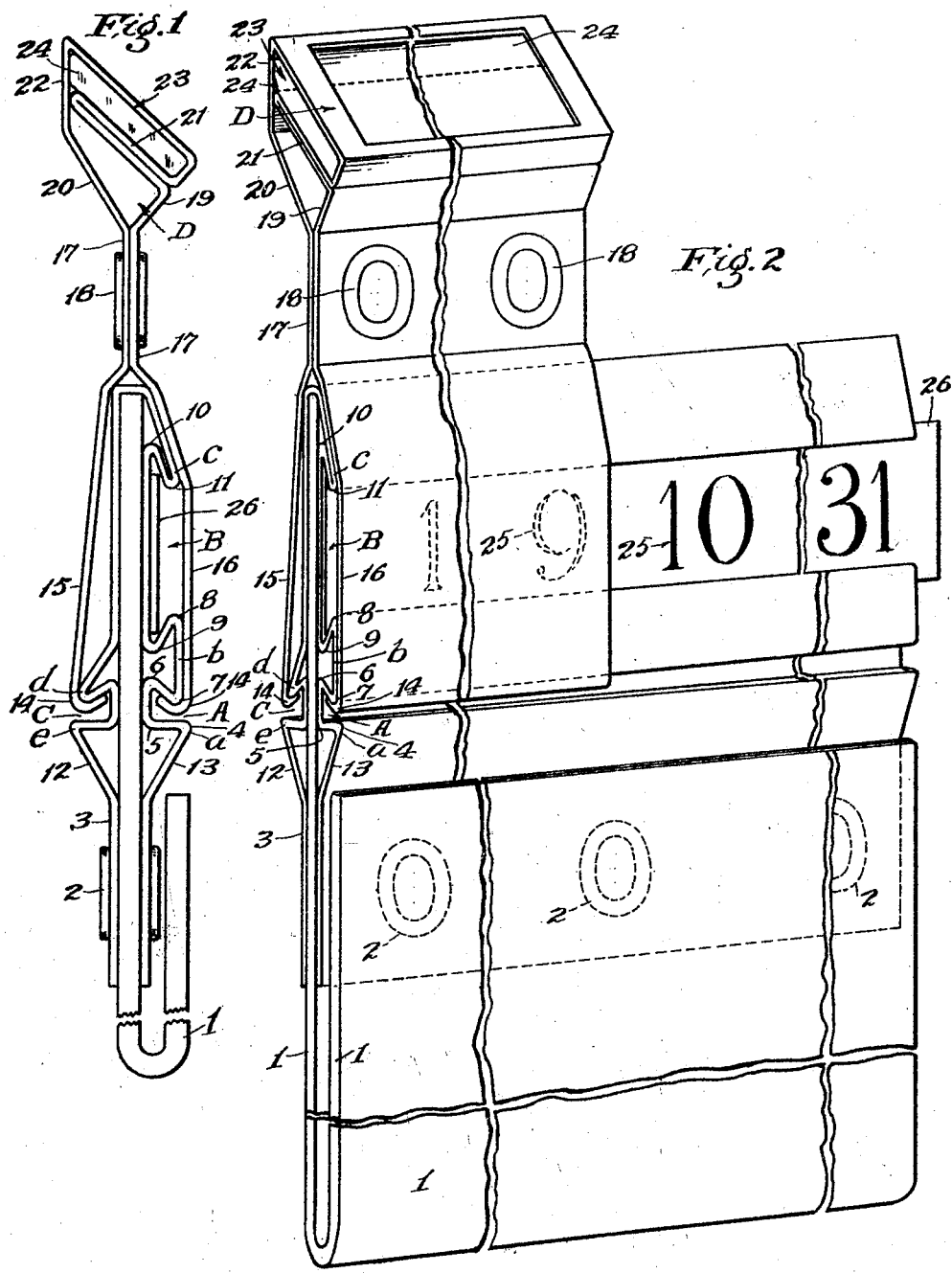

1,562,622

UNITED STATES PATENT OFFICE.

ARTHUR ROSWELL DODGE, OF LOS ANGELES, CALIFORNIA, ASSIGNOR OF ONE-HALF TO F. W. DOUGLAS, OF LOS ANGELES, CALIFORNIA.

GUIDE AND FOLDER.

Application filed April 4, 1922. Serial No. 549,604.

*To all whom it may concern:*

Be it known that I, ARTHUR ROSWELL DODGE, a citizen of the United States, residing at Los Angeles, in the county of Los Angeles and State of California, have invented new and useful Improvements in Guides and Folders, of which the following is a specification.

This invention relates to guides and folders for use in correspondence files and card indexes, and effects economies in material and time through greater elasticity in the use of this class of office equipment.

Heretofore, guides and folders have been constructed with tabs permanently fixed on to the body sheet of the guide or folder. This permanent construction in tabs is frequently wasteful and inconvenient to the dealer or vendor as well as to the consumer or user, particularly to the latter when purchasing index equipment for newly adopted files or when securing additional index supplies for existing files or in adapting index supplies on hand to readjustments in filing requirements.

For example, the consumer may require a supply of guides or folders with five-cut tabs in one or two only of the five positions, and in such case the dealer must either break his standard sets of five-cut five positions, leaving him with merchandise of uncertain marketability, or induce the consumer to wait until the manufacturer can furnish guides or folders with the particular arrangement of tabs required.

The same condition exists where the consumer requires additional supplies for existing files or abandons a particular arrangement on hand to meet a different filing need.

Detached or separate tabs that can be slipped over the edge of the guide or folder and that depend for security of position on spring-metal construction or additional parts to effect a temporary grip are also known, but such tabs are subject to easy displacement from proper position, are more or less injurious to the edge of the guide or folder, can be easily pulled off, and are inconvenient to handle. Their utility is confined mostly to ledgers, etc., as index tabs, and they do not come generally within the purpose or scope of this invention.

I have discovered a construction to meet this condition by applying to guides and folders a tongue and groove principle in a sliding device on a rail on one or both sides and above or below the top edge of a guide or folder.

The rail is fixed to and extends along the body of the guide or folder and is constructed with a groove or other guiding means with which running connection of the tabs from either end may be had, as by inserting the turned edges of the tab legs and adapting such legs to grip the rail firmly. The tab may with some pressure be slid along sidewise to any desired position, and is not easily displaced accidentally. The grip of the legs on the rail prevents removal of the tab from the body of the guide or folder by vertical action.

Heretofore, tabs for guides or folders have been constructed with angle faces for name slip or other insert. Such tabs project over the guide or folder at such an angle to the neck of the tab, in front or rear, as to obstruct the ready removal of papers or cards from the files.

I have provided a tab having surfaces sloping upwardly and outwardly from the neck point, in both front and rear, thus eliminating any obstruction to removal of papers or cards.

In the case of angle tabs heretofore known, the name slip or other insert is likely to fall down in the tab out of proper position, thus interfering with the convenience and efficiency of the file.

To avoid this difficulty, I have provided a ledge, shelf or backing for the name slip or insert to rest upon inside the tab, thus preventing any downward displacement of the name slip or insert and affording an additional snugness of fit for the name slip against displacement and also affording additional strength to the tab.

Guides and folders have heretofore been printed along the top edge with 1–31 days of the month and with other follow-up or stock record data, etc., and supplies so printed are not adapted to be used economically for any other purpose than that requiring the data printed thereon.

I have provided just above the slide groove of the rail an additional groove or slot into which may be inserted from either end, printed slips with follow-up or other data. Said slips are removable and interchangeable, thus prolonging the utility of the guide or folder for any filing requirement.

Heretofore, signals of various designs have been used on guides and folders for follow-up, stock record and other purposes. These signals are often difficult to attach to guides or folders of varying thicknesses of materials, and are more or less injurious to the edge of the guide or folder, and are dependent upon spring-metal construction for security of proper position and are subject to easy displacement from position and can be readily pulled off vertically.

I have provided a signal with an angle face and hollow body construction adapted to and carried by gripping legs with sharply turned edges, like those of my newly invented tab, and adapted to slidable connection with the rail, and to grip the same to fix the signal in proper position after being slid along for signalling purposes. This signal cannot be detached or removed from the rail on the guide or folder by a vertical action.

Guides and folders for use in correspondence files or card indexes are customarily made of manila, bristol board or pressboard stock and metal.

An object of this invention is to provide means whereby guides and folders may be greatly improved with respect to the features above outlined.

This invention involves the application to guides and folders, made of any material, of a rail on one or both sides of the body of the guide or folder near the top edge, or a rail applied along the top edge of the guide or folder. This rail may be constructed of any suitable material as sheet metal or celluloid or partly of sheet metal and partly of celluloid.

An object is to provide a light, strong attachment by which to supply the body or leaves of guides or folders with such rails. Other objects, advantages and features of invention may appear from the accompanying drawings, the subjoined detailed description and the appended claims.

The invention is applicable in various forms.

The accompanying drawings illustrate the invention in some of the forms in which the same may be embodied.

Figure 1 is a fragmental end view of a guide or folder constructed in accordance with the invention.

Fig. 2 is a fragmental perspective of the front face of the guide or folder shown in Fig. 1.

Fig. 3 is a view analogous to Fig. 2, showing the rear face of the guide or folder.

Fig. 4 is an end view of an angle-faced signal, with upwardly and outwardly sloping faces back and front, and provided with legs having turned edges to slip into and make a running connection with the grooves of the rail on the guide or folder sheet.

Figs. 5, 6, 7, and 8 are end views to illustrate alternative constructions of the head of the name tab.

Figs. 9, 10, 11, 12 and 13 are fragmental end views of tabs to illustrate alternative constructions of legs applicable respectively to heads of the name tabs shown in Figs. 5-8, respectively, and to the signal head shown in Fig. 4.

Figs. 14, 15, 16, 17 and 18 are end views to illustrate alternative constructions of the rail, with one or more slide-ways constructed below the top edge of the guide or folder sheet, and adapted respectively to carry the tab or signal legs shown in Figs. 9-13, respectively.

Fig. 19 is an end view to illustrate an alternative construction of the tab legs where the slide ways of the rail on the guide or folder are constructed on or above the top edge of the guide or folder sheet.

Fig. 20 is an end view to illustrate an alternative construction of the rail where the slide-ways are constructed on or above the top edge of the guide or folder.

The form shown in Figs. 19 and 20 minimizes the over-all thickness of the attachment.

The views are all on greatly enlarged scale.

1 indicates an index guide or folder sheet to which has been fixed by suitable attaching means as eyelets 2 a slide rail indicated in a general way by the character 3. The slide rail is formed of sheet material, and is provided on the front side with bends forming lateral projections $a$, $b$, and $c$, and on the rear side with bends forming lateral projections $d$ and $e$. The lateral projections extend horizontally from vertical edge to vertical edge of the sheet. The material between projections $a$ and $b$ is inwardly bent to form a slide groove A having corners 4, 5, 6 and 7, extending horizontally from vertical edge to vertical edge of the sheet.

Between the projections $b$ and $c$, there is formed a slide groove B having horizontal corners 8, 9, 10 and 11, likewise extending from vertical edge to vertical edge of the sheet.

The rail 3 practically conforms to the top of the sheet, and is provided on the rear side with a groove C, formed between the lateral projections $d$ and $e$.

A and C illustrate a type of slide grooves or slots for running connections with the tab legs.

B illustrates a type of groove or slot for holding printed slips for follow-up dates, stock record data, etc.

Faces 12 and 13 constitute upwardly and outwardly sloping guards or shields for the slide grooves and for the turned edges 14 of the legs 15 and 16 of the detachable and adjustable tab D, of sheet material, affording non-obstructing surfaces for the removal of papers or cards.

The legs of the tab are provided with turned edges that form a running and gripping connection with a groove of the rail.

The neck 17 of the tab is formed of two thicknesses of the tab material fastened together by suitable means, as cement or an eyelet or other fastening device. An eyelet 18 is shown for this purpose.

The tab is provided with upwardly and outwardly sloping surfaces 19 and 20 for the head of the tab, which head is centered at point 17.

The tab is provided with a shelf, ledge or backing 21, formed of two thicknesses of the tab material, and causing a reinforced construction for the tab and forming a rest for the name slip or other insert.

The sheet material of which the tab is formed is bent in a loop as shown in Fig. 1, said loop being bent inward from the front face 19 and extending to and abutting against the inside of the vertical face 22, which extends upwardly from the sloping face 20, to form the ledge and afford a chamber 23 above the same adapted to receive a name slip or other insert 24.

The signal shown in Fig. 4 corresponds in construction to the tabs shown in Figs. 1, 2 and 3, except that it is of less width and less height, and it is not provided with the reinforcing shelf.

The use of this signal is in connection with the follow-up dates or stock record data 25 printed on the slip 26 in the groove B.

The index tabs may be constructed of different forms as is indicated in Figs. 5, 6, 7 and 8.

In Fig. 5 the front limb of the tab is folded as at 27 in parallelism with the rear upwardly sloping face 20 and then turned forwardly to form the shelf 21, and is bent downward to form a reinforcement 28; the same being a doubling of the material at the lower portion of the face 19.

In Fig. 6 the reinforcement and shelf 21 is formed by a loop 29 that is doubled in from the angle between the sloping rear face 20 and the vertical rear face 22.

In Fig. 7 the top of the rear sloping face 20' constitutes the shelf or ledge 21'.

In Fig. 8 a reinforcing bar 30 is shown to form the shelf 21.

In Figs. 9, 10, 11, 12 and 13 different forms of the legs of the tabs or signal are shown, each form being adapted to constitute the legs of any of the forms of tab or signal shown.

In Fig. 9 the edges or hooks 14' of the legs 15' and 16' are rounded inwardly.

In Fig. 10 the corresponding edges or hooks 14' of Fig. 9 are bent outwardly and then inwardly at right angles, at 31.

In Fig. 11 the edges corresponding to the edges or hooks 14' of Fig. 9 are rounded outwardly, as at 32.

In Fig. 12 the legs 15' and 16' are bent outwardly and upwardly as at 33 and are then bent downwardly as at 34 to 35 for reinforcement when engaged in running connection with the groove of the rail adapted therefor.

In Fig. 13 the construction of the legs 15" and 16" and edges or hooks 14", are similar to the legs 15 and 16 and hooks 14 of Fig. 1, except that the legs are shortened so as to be adapted to the grooves A and C of Fig. 18.

In Figs. 14, 15, 16, 17 and 18 different forms of the rail are shown, each form being adapted respectively to the legs shown in Figs. 9 to 13, respectively in couples made of the forms shown in Figs. 9, 14; 10, 15; 11, 16; 12, 17; and 13, 18; and the characters A and C are applied to the grooves analogous to the grooves so marked in the other views.

In Fig. 14 the grooves A and C are rounded inwardly to accommodate the edges or hooks 14 of Fig. 9.

In Fig. 15 the rail construction is in two parts 36 and 37, both eyeleted to, or otherwise fastened or cemented to the guide or folder sheet 1. Grooves A and C of Fig. 15 are formed by an outward and inward upward bending of the leg material, at right angles to accommodate the turned edges or hooks 14 of Fig. 10.

In Fig. 16 the grooves A and C are rounded outwardly to accommodate the outwardly turned edges or hooks 14 of Fig. 11.

In Fig. 17 the rail construction is in two parts 38 and 39 and eyeleted as at 2 or otherwise fastened or cemented to the guide or folder sheet 1. The purpose of the construction shown in Fig. 17 is to use spring metal for portions 39 of the rail, thus permitting the legs shown in Fig. 12 to make running connection with grooves A and C of Fig. 17, either from the ends of the rail or to be snapped into the grooves A and C from the top 40 of the guide or folder sheet.

In Fig. 18 the grooves A and C are adapted to the printed follow-up and stock record slip as well as to the running connection for the edges or hooks 14 of Fig. 13.

In Fig. 19 the legs of the tab or signal are of shortened construction to engage the grooves A', C' of the rail shown in Fig. 20.

In Fig. 20 the grooves A', C' are constructed one above the other above the top edge of the guide or folder sheet to accommodate the turned edges or hooks 14''' of the legs 15''' and 16''' of Fig. 19.

The grooves A' and C' in Fig. 20 are shown extending upwardly aslant to receive the limbs or hooks 14''' of the runner as shown in Fig. 19; and such runner and the rail constructed as shown in Fig. 20 are minimized in width as the grooves are not opposite each other and are above the top of the sheet.

I claim:

1. In combination with an index sheet, re-inforcing means fixed thereon and embracing the top of said sheet and forming a way; a tab; and a runner movable along and connecting the tab to said way.

2. In combination with an index sheet, a rail bent up from sheet material and fastened to and also adapted to embrace the top of the sheet, and forming a way along a side of said sheet; and a runner engaging and movable along said way.

3. In combination with an index sheet, a rail bent up from sheet material and fastened to and also adapted to embrace the top of the sheet, and forming ways along opposite sides of said sheet, and a runner engaging and movable along said ways.

4. In combination with an index sheet, a rail fastened to and also adapted to embrace the top of the sheet, and forming a way along a side of said sheet; and a runner engaging and movable along said way.

5. In combination with an index sheet, a rail bent up from sheet material and fastened to and also adapted to embrace the top of the sheet, and forming ways along opposite sides of said sheet, and a runner extending over the top edge of said sheet and provided with in-bent portions engaging and movable along said ways.

6. In combination with an index sheet, a rail fastened to and also adapted to embrace the top of the sheet, and forming a way along a side of said sheet; and a runner embracing the rail and engaging and movable along said way.

7. The combination with a sheet of a rail formed of sheet material bent to embrace the top of said sheet and to form ways along said sheet and guards sloping upwardly and outwardly from said sheet below said ways; and a runner embracing said rail and adapted to run along said ways; said guards being arranged to deflect the edges of papers while being withdrawn so as to prevent the same from catching on the rail.

8. The combination with a sheet of a rail formed of sheet material bent to embrace the top of said sheet and to form ways along said sheet and guards sloping upwardly and outwardly from said sheet below said ways; and a runner embracing said rail and adapted to run along said ways; said guards being arranged to deflect the edges of papers while being withdrawn so as to prevent the same from catching on the rail; said rail being provided above said guard with a downwardly and outwardly extending portion to deflect the bottom of the sheet to prevent it from engaging a guard when the sheet is inserted.

9. The combination with a sheet having a rail thereon, of a runner adapted to run on said rail and bent to form a chamber adapted to receive a name slip and also bent to form a rest below said chamber to support a name slip therein.

10. In combination with a sheet; a rail connected to said sheet and provided with bends upon one side to form a way adapted to receive a follow-up date slip, and a runner mounted on said rail and provided above said rail with means for holding a name tab.

11. The combination of a rail adapted to embrace the upper edge of a sheet and having ways on opposite sides, and having upon one side a slide way, and a runner extending over the rail and adapted to engage the ways; said rail and runner being provided with upwardly and outwardly sloping faces to facilitate removal of a sheet upwardly across the rail and runner.

12. In a device of the character described, a sheet-metal runner bent at its upper end to form a name tab holder and a shelf or ledge to form a reinforcement.

13. A tab formed of sheet material bent to form upwardly and outwardly slanting faces and having an inward bend extending from one side to the other side therein, to form a reinforcement and to form a rest for a name slip.

14. A rail for a sheet; said rail being provided on one side near the top with a slide way and provided on both sides below said slide way with a groove to be engaged by a runner.

15. The combination with a sheet, of a rail to be fastened to said sheet and provided on opposite sides with upwardly and inwardly extending grooves above the upper edge of the sheet; and a runner adapted to run along the rail and provided with upwardly and inwardly extending means to engage said grooves.

16. In an index guide or folder, a rail adapted to carry a runner and provided with a groove or slot adapted to receive a removable and interchangeable printed data slip.

17. The combination with a sheet, of a rail connected to said sheet and provided with a groove adapted to receive a follow-up date slip and with ways below said groove; and a runner having legs adapted to embrace said rail and having turned edges that form a running and gripping connection with said ways.

18. An index sheet provided along its upper edge with a rail bent upon one side or face to form a horizontal groove adapted to receive and hold a slip on the outside surface of said rail.

In testimony whereof, I have hereunto set my hand at Los Angeles, California, this 23rd day of March, 1922.

ARTHUR ROSWELL DODGE.